Figure 1:
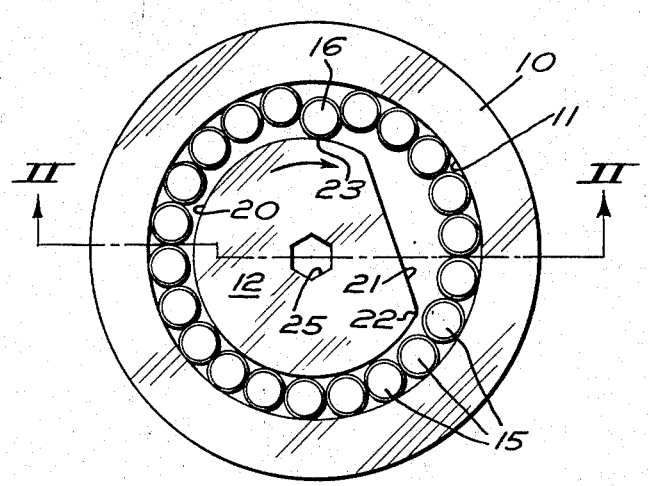

Nov. 30, 1954    H. J. VANSTROM    2,695,481
WORK-HOLDING FIXTURE
Filed April 15, 1954

INVENTOR.
HAROLD J. VANSTROM
BY
Beau, Brooks, Buckley & Beau,
ATTORNEYS.

United States Patent Office

2,695,481
Patented Nov. 30, 1954

2,695,481

WORK-HOLDING FIXTURE

Harold J. Vanstrom, Bemus Point, N. Y.

Application April 15, 1954, Serial No. 423,356

10 Claims. (Cl. 51—217)

This invention relates to work holding devices and more particularly to a novel fixture for holding a plurality of objects in accurate relative locations for performing abrading or other machining operations thereon or for analogous purposes.

In grinding the radial or end faces of relatively small cylindrical workpieces, particularly in mass production or when a multiplicity of pieces must be similarly ground or otherwise machined, a considerable problem is encountered in properly positioning the workpieces for such grinding or similar machining. The roller elements of roller bearings are a typical case in point, although the work holding fixture of the present invention may be employed for any similar purposes wherever cylindrical or partly cylindrical workpieces are to be held with their end or radial faces or one of their end or radial faces accessible for grinding, other machining, or any similar fabricating or treating operation.

In the instance set forth herein by way of example the cylindrical workpieces, prior to the end face grinding contemplated in the method of the present invention and involving the employment of the fixture of the present invention, have their peripheries accurately ground to precision dimensions. However, it is not necessary to successful operation of the fixture of the present invention that the diameters of the workpieces be entirely precise and equal in their diameters or in finally finished form, although the results obtained will depend in general upon the trueness of the peripheries of the workpieces since, in any event, the end faces of the workpieces held in the fixture of the present invention will be presented for grinding or other machining in such manner that they are accurately disposed at right angles to their peripheries.

While the work holding fixture of the present invention is applicable wherever the advantages inherent in the device make its use advisable, reference will be had in the following specification to its use in holding a plurality of cylindrical workpieces in proper alignment on the magnetic chuck work-receiving table of a conventional surface grinder, to present the workpieces in such position that the radial end faces of a considerable number of the workpieces may be simultaneously ground.

While a single complete specific embodiment of the principles of the present invention, both as to construction of the fixture itself and as to its mode of environment of use, is set forth in detail in the following specification and is illustrated in the accompanying drawing, it is to be understood that the invention is not limited to the details shown and that certain variations in the construction of the fixture and its mode of use may be made without departing from the spirit of the invention, the scope of which is limited only as defined in the appended claims.

Figure 2:
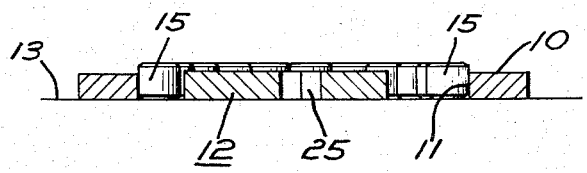

In the drawing:

Fig. 1 is a top plan view of one form of the fixture of the present invention holding a number of cylindrical workpieces in tangentially abutting positions with their axes extending vertically and parallel to each other; and Fig. 2 is a cross-sectional view on the line II—II of Fig. 1.

Referring particularly to Fig. 1, the fixture of the present invention comprises essentially an annular member 10 having a circular central opening 11, the walls of which are preferably precision ground to be precisely at right angles to the axis of the annulus, and a cam member 12, the contour of which will be more specifically described later herein.

In use the annular member 10 is placed upon a surface plate or similar work surface or directly on the magnetic chuck of a surface grinder such as is indicated by the numeral 13 in Fig. 2. A group of cylindrical workpieces in the form of small rollers, the workpieces being designated 15 in the drawing, are placed endwise on the table 13 and arranged generally in abutment with the periphery of the opening 11 of annular member 10, approximately as shown in Fig. 1 of the drawing.

The annular member 10 and particularly its central opening 11 are so proportioned as to diameter or interior circumference that such an arrangement of the workpieces 15 against the periphery of the circular opening 11 leaves an opening which will not completely receive the final workpiece, such final workpiece being designated 16 in Fig. 1.

Cam member 12 is arranged to provide a portion which may be manipulated to exert a camming effect radially outwardly against the projecting workpiece 16 to tend to urge the same into alignment with the other workpieces 15, and the space into which the workpiece 16 is thus urged is large enough so that, while it will not fully accommodate the workpiece 16, it permits its entry thereinto a sufficient distance to have substantial force components against the two adjacent workpieces 15 with which it is in tangential abutment. Such force components will be normal to the lines of tangency and, due to the abutment of the adjacent workpieces 15 with opening 11, will produce forces thereagainst in a circular direction, that is, in a direction lying along a pitch circle drawn through the centers of the various workpieces 15.

In the present instance, for simplicity of manufacture and facility in placement within the group of cylindrical workpieces, and for cooperation therewith in producing the desired camming and locking action, the cam member 12 has a contour which is for the most part circular, as indicated at 20 in Fig. 1. A portion of cam 12 or the contour thereof is flattened as at 21. At one of its ends the flattened portion 21 may merge directly with the arcuate portion 20 as at 22 but at the opposite end of flattened portion 21 connects with arcuate portion 20 by way of or by means of a curved portion 23 which comprises the effective camming surface of cam member 12.

After the cylindrical workpieces have been generally arranged in the form described above, cam member 12 is placed in the central space enclosed by the cylindrical workpieces 15 and 16. During this operation the flat portion 21 of cam member 12 is preferably placed at the side where the extra or projecting cylindrical workpiece 16 is located and thus the major circular portion 20 of cam member 12 may be used to sort of press the other workpieces 15 against the inner peripheral wall of annular member 10, that is, against the wall of its circular opening 11, in case there is slight misalignment of some of the workpieces 15.

Cam member 12 is then rotated in a clockwise direction as viewed in Fig. 1 until its effective camming surface 23 comes into engagement with the protruding cylindrical workpiece 16. This motion will likewise cause the circular portion 20 to engage tangentially against a pair of workpieces 15 at a point diametrically opposite to the camming surface 23 and workpiece 16. In the illustrated instance cam member 12 has a hexagonal or similar non-circular wrench opening 25 approximately centrally thereof and an Allen wrench may be introduced into this opening to produce further forcible clockwise rotation of cam member 12 and resultant pressure of cam surface 23 against workpiece 16. This effectively locks all of the cylindrical workpieces 15 and the cylindrical workpiece 16 into tangential abutment with each other and, as to the workpieces 15, into secure tangential abutment with the wall of circular opening 11.

In this manner the workpieces 15 and 16 are all simply and securely locked in such position that the axes are accurately parallel regardless of any possible irregularities or inaccuracies of their end faces. If this assembling and locking operation is carried on on the usual magnetic chuck, it is merely necessary at this point to energize the magnetic chuck and proceed with the grinding of one end face of each of the workpieces simultaneously.

The workpieces are securely locked as illustrated in Fig. 1. The locking action is unusual in appearance since the workpieces at the right-hand side of Fig. 1 would appear to be free to move radially inwardly, on casual inspection. However, that is not the case and the entire locked assembly of annular member 10, cam 12, and all of the locked workpieces, may be picked up, transferred to other surfaces or machines, or otherwise handled, without dislodgement of any of the workpieces.

Following this operation and the grinding or other treatment of the upper ends of the workpieces as viewed in Fig. 2, the workpieces may all be reversed end for end to grind their opposite end or radial surfaces. To do this is not necessary to disassemble the entire group of workpieces, but the entire fixture with the locked workpieces may merely be turned upside down on the work surface, such as the surface of magnetic chuck 13, and the cam member 12 may be rotated to momentarily unlock it and release the workpieces 15 and 16.

Since annular member 10 and cam member 12 are preferably of substantially less thickness or vertical dimension than the axial lengths of the workpieces, this temporary unlocking permits the annular member 10 and cam member 12 to drop to the surface of the work table, leaving the ends of the workpieces which are now uppermost disposed substantially above the top surfaces of annular member 10 and cam member 12. The workpieces are then relocked by rotation of cam member 12, in this case in a counterclockwise direction as viewed from above, and the second end or radial face of each of the workpieces may be ground or otherwise worked upon as desired.

What is claimed is:

1. A fixture for holding a plurality of cylindrical workpieces with their end faces in substantially common planes comprising an annulus for receiving a generally circular series of such workpieces disposed tangentially against the inner periphery of said annulus with their axes parallel to the axis of the annulus and each of the workpieces in engagement with the adjacent workpieces, the inner periphery of said annulus being so proportioned that one of said workpieces is only partially movable into said series and projects radially inwardly therefrom, and a cam member in the space within the series of workpieces thus arranged and engaging tangentially against said one workpiece to urge it radially outwardly and thus lock the remainder of the series of workpieces in tangential abutment with said inner periphery and with each other.

2. A fixture for holding a plurality of cylindrical workpieces comprising a member having a circular opening for receiving a generally circular series of such workpieces disposed tangentially against the wall of said opening with their axes parallel to the axis of the opening and each of the workpieces in engagement with the adjacent workpieces, the periphery of said opening being so proportioned that one of said workpieces is only partially movable into said series and projects radially inwardly therefrom, and a cam member in the space within the series of workpieces thus arranged and engaging tangentially against said one workpiece to urge it radially outwardly and thus lock the remainder of the series of workpieces in tangential abutment with the wall of said opening and with each other.

3. A fixture for holding a plurality of cylindrical workpieces with their end faces in substantially common planes comprising an annulus for receiving a generally circular series of such workpieces disposed tangentially against the inner periphery of said annulus with their axes parallel to the axis of the annulus and each of the workpieces in engagement with the adjacent workpieces, the inner periphery of said annulus being so proportioned that one of said workpieces is only partially movable into said series and projects radially inwardly therefrom, and a cam member engaging against said one workpiece to urge it radially outwardly and thus lock the remainder of the series of workpieces in tangential abutment with said inner periphery and with each other.

4. A fixture for holding a plurality of cylindrical workpieces comprising a member having a circular opening for receiving a generally circular series of such workpieces disposed tangentially against the wall of said opening with their axes parallel to the axis of the opening and each of the workpieces in engagement with the adjacent workpieces, the periphery of said opening being so proportioned that one of said workpieces is only partially movable into said series and projects radially inwardly therefrom, and means engaging against said one workpiece to urge it radially outwardly and thus lock the remainder of the series of workpieces in tangential abutment with the wall of said opening and with each other.

5. A fixture for holding a plurality of cylindrical workpieces with their end faces in substantially common planes comprising an annulus for receiving a generally circular series of such workpieces disposed tangentially against the inner periphery of said annulus with their axes parallel to the axis of the annulus and each of the workpieces in engagement with the adjacent workpieces, the inner periphery of said annulus being so proportioned that one of said workpieces is only partially movable into said series and projects radially inwardly therefrom, and a cam member in the space within the series of workpieces thus arranged, said cam member having a portion engaging against a workpiece opposite to said one workpiece, and a camming portion engaging against said one workpiece to urge it radially outwardly and thus lock the remainder of the series of workpieces in tangential abutment with said inner periphery and with each other.

6. A fixture for holding a plurality of cylindrical workpieces with their end faces in substantially common planes comprising an annulus for receiving a generally circular series of such workpieces disposed tangentially against the inner periphery of said annulus with their axes parallel to the axis of the annulus and each of the workpieces in engagement with the adjacent workpieces, the inner periphery of said annulus being so proportioned that one of said workpieces is only partially movable into said series and projects radially inwardly therefrom, and a cam member in the space within the series of workpieces thus arranged, said cam member having a portion engaging against a workpiece opposite to said one workpiece, and a camming portion engaging against said one workpiece and adapted upon rotation of said cam member to urge said one workpiece radially outwardly and thus lock the remainder of the series of workpieces in tangential abutment with said inner periphery and with each other.

7. A fixture for holding a plurality of cylindrical workpieces comprising a member having a circular opening for receiving a generally circular series of such workpieces disposed tangentially against the wall of said opening with their axes parallel to the axis of the opening and each of the workpieces in engagement with the adjacent workpieces, the periphery of said opening being so proportioned that one of said workpieces is only partially movable into said series and projects radially inwardly therefrom, and a cam member in the space within the series of workpieces thus arranged, said cam member having a portion engaging against a workpiece opposite to said one workpiece, and a camming portion engaging against said one workpiece to urge it radially outwardly and thus lock the remainder of the series of workpieces in tangential abutment with the wall of said opening and with each other.

8. A fixture for holding a plurality of cylindrical workpieces comprising a member having a circular opening for receiving a generally circular series of such workpieces disposed tangentially against the wall of said opening with their axes parallel to the axis of the opening and each of the workpieces in engagement with the adjacent workpieces, the periphery of said opening being so proportioned that one of said workpieces is only partially movable into said series and projects radially inwardly therefrom, and a cam member in the space within the series of workpieces thus arranged, said cam member having a portion engaging against a workpiece opposite to said one workpiece, and a camming portion engaging against said one workpiece and adapted upon rotation of said cam member to urge said one workpiece radially outwardly and thus lock the remainder of the series of workpieces in tangential abutment with the wall of said opening and with each other.

9. A fixture for holding a plurality of cylindrical workpieces with their end faces in substantially common planes comprising an annulus for receiving a generally circular series of such workpieces with their axes parallel to the axis of the annulus and each of the workpieces in engagement with the adjacent workpieces, the inner periphery of said annulus being so proportioned that one of said workpieces is only partially movable into said series, and a cam member in the space within the series of workpieces thus arranged and engaging tangentially against said one workpiece to urge it radially outwardly and thus lock the remainder of the series of workpieces in tangential abutment with said inner periphery and with each other.

10. A fixture for holding a plurality of cylindrical workpieces comprising a member having a circular opening for receiving a generally circular series of such workpieces with their axes parallel to the axis of the opening and each of the workpieces in engagement with the adjacent workpieces, the periphery of said opening being so proportioned that one of said workpieces is only partially movable into said series, and means engaging against said one workpiece to urge it radially outwardly and thus lock the remainder of the series of workpieces in tangential abutment with the wall of said opening and with each other.

References Cited in the file of this patent

UNITED STATES PATENTS

| Number | Name | Date |
|---|---|---|
| 1,017,880 | Landis | Feb. 20, 1912 |
| 1,444,721 | Zumdahl | Feb. 6, 1923 |
| 1,763,647 | Danner | June 17, 1930 |
| 2,346,053 | Smith | Apr. 4, 1944 |
| 2,483,697 | Giles | Oct. 4, 1949 |